(12) United States Patent
Lee et al.

(10) Patent No.: US 8,665,383 B2
(45) Date of Patent: Mar. 4, 2014

(54) MOTHER SUBSTRATE FOR STEREOSCOPIC IMAGE DISPLAY DEVICE

(75) Inventors: Bonggeum Lee, Seoul (KR); Jaeho Lee, Daegu (KR)

(73) Assignee: LG Display Co., Ltd., Seoul (KR)

( * ) Notice: Subject to any disclaimer, the term of this patent is extended or adjusted under 35 U.S.C. 154(b) by 273 days.

(21) Appl. No.: 13/077,565

(22) Filed: Mar. 31, 2011

(65) Prior Publication Data
US 2011/0242442 A1  Oct. 6, 2011

(30) Foreign Application Priority Data
Apr. 2, 2010  (KR) .......................... 10-2010-0030531

(51) Int. Cl.
*G02F 1/1335* (2006.01)
*G02F 1/1347* (2006.01)

(52) U.S. Cl.
USPC .............................................. 349/15; 349/74

(58) Field of Classification Search
USPC ..................................................... 349/15, 74
See application file for complete search history.

(56) References Cited

U.S. PATENT DOCUMENTS

| 2004/0263771 A1* | 12/2004 | Jeong et al. | 349/187 |
|---|---|---|---|
| 2005/0285997 A1* | 12/2005 | Koyama et al. | 349/117 |
| 2009/0190049 A1* | 7/2009 | Hong et al. | 349/15 |
| 2009/0225243 A1* | 9/2009 | Kim et al. | 349/15 |
| 2009/0237602 A1* | 9/2009 | Kubota et al. | 349/122 |
| 2010/0045620 A1* | 2/2010 | Long et al. | 345/173 |

FOREIGN PATENT DOCUMENTS

| JP | 2006011212 A | 1/2006 |
|---|---|---|
| KR | 1020060067449 A | 6/2006 |
| KR | 20090063534 A | 6/2009 |

OTHER PUBLICATIONS

Office Action issued in corresponding Korean Patent Application No. 10-2010-0030531, mailed Oct. 31, 2012.
Office Action issued in corresponding Korean Patent Application No. 10-2010-0030531, mailed May 3, 2013, 4 pages.

* cited by examiner

*Primary Examiner* — Jessica M Merlin
(74) *Attorney, Agent, or Firm* — Brinks, Gilson & Lione

(57) ABSTRACT

A stereoscopic image display device includes a pixel array cell provided with a plurality of pixels used to display 2D and 3D images, a switchable optical layer opposite to the pixel array cell, and a transparent both-sided adhesive film joining the pixel array cell to the switchable optical layer between the pixel array cell and the switchable optical layer.

6 Claims, 20 Drawing Sheets

MOTHER SUBSTRATE FOR STEREOSCOPIC IMAGE DISPLAY DEVICE

This application claims the benefit of the Korean Patent Application No. 10-2010-0030531, filed in Korea on Aug. 2, 2010, which are hereby incorporated by reference as if fully set forth herein.

BACKGROUND

1. Field of the Invention

This document relates to a stereoscopic image display device. Also, this document relates to a stereoscopic image display device mother substrate and a method of manufacturing the mother substrate.

2. Discussion of the Related Art

Stereoscopic image display devices implement stereoscopic images, that is, three-dimensional (3D) images using a stereoscopic technique and an autostereoscopic technique. The stereoscopic technique uses binocular parallax images which are great in the stereoscopic effect, and may have a type of using glasses ("glass type") and a type of not using glasses ("glassless type"), both of which are put to practical use.

In the glass type, binocular parallax images are displayed on a direct view display panel or a projector by a method of changing polarization directions or a time division method, and polarization glasses or liquid crystal shutter glasses are used to implement stereoscopic images. The glassless type is classified into a parallax barrier method and a lenticular method.

FIG. 1 is a diagram illustrating a method of implementing 3D images by the parallax barrier method. Referring to FIG. 1, the parallax barrier method implements 3D stereoscopic images by division into left eye images and right eye images through selective blocking of light output from a display panel 1 using a barrier 2. However, there is a disadvantage in that a luminance loss is great since the light passing through the barrier 2 is reduced to about 50% or less as compared with incident light.

FIG. 2 is a diagram illustrating a method of implementing 3D images by the lenticular method. Referring to FIG. 2, a stereoscopic image display device using the lenticular method includes a lenticular lens 4 which is positioned between a display panel 3 and a viewer. The lenticular lens 4 implements 3D stereoscopic images by division into right eye images and left eye images. The lenticular method is advantageous in terms of having a lower luminance loss than the parallax barrier method.

The parallax barrier method and the lenticular method have problems in that only 3D stereoscopic images can be implemented. Also, The parallax barrier method and the lenticular method have problems in that switching between a 2D image and a 3D image cannot be performed since switching between a turned-on state and a turned-off state of the light division cannot be performed. Thereby, there has been a switchable lens/barrier method in which there is no luminance loss and 2D and 3D images can be switched.

In the switchable lens/barrier method, 2D and 3D images are switched by controlling liquid crystal of a switchable lens/barrier cell with a voltage. The switchable lens/barrier method includes a process of joining the switchable lens/barrier cell to a display panel. However, there is a problem in that an alignment is difficult when the switchable lens/barrier cell is joined to the display panel.

BRIEF SUMMARY

According to an embodiment of this document, there is provided a stereoscopic image display device including a pixel array cell provided with a plurality of pixels used to display 2D and 3D images; a switchable optical layer opposite to the pixel array cell; and a transparent both-sided adhesive film joining the pixel array cell to the switchable optical layer between the pixel array cell and the switchable optical layer.

According to an embodiment of this document, there is provided a stereoscopic image display device mother substrate including a pixel array cell mother substrate provided with first alignment keys and including at least one pixel array cell which is provided with a plurality of pixel used to display 2D and 3D images; a switchable optical layer mother substrate provided with second alignment keys and including at least one switchable optical layer opposite to the pixel array cell; and a transparent both-sided adhesive film joining the pixel array cell to the switchable optical layer between the pixel array cell mother substrate and the switchable optical layer mother substrate.

According to an embodiment of this document, there is provided a method of manufacturing a stereoscopic image display device mother substrate including a first step of forming a pixel array cell mother substrate provided with first alignment keys and including at least one pixel array cell which is provided with a plurality of pixel used to display 2D and 3D images; a second step of forming a switchable optical layer mother substrate provided with second alignment keys and including at least one switchable optical layer opposite to the pixel array cell; a third step of forming a transparent both-sided adhesive film joining the pixel array cell to the switchable optical layer between the pixel array cell mother substrate and the switchable optical layer mother substrate; a fourth step of joining a first adhesive layer of the transparent both-sided adhesive film to the switchable optical layer mother substrate; and a fifth step of aligning the pixel array cell mother substrate and the switchable optical layer mother substrate with each other using the first and second alignment keys and joining a second adhesive layer of the transparent both-sided adhesive film to the pixel array cell mother substrate.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE DRAWINGS AND THE PRESENTLY PREFERRED EMBODIMENTS

Figure 1:
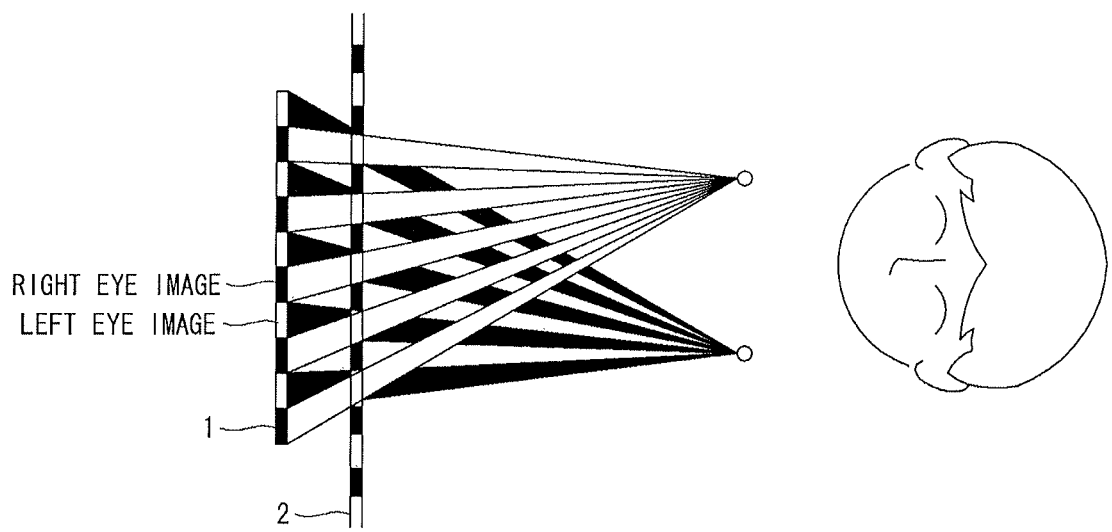
FIG. 1 is a diagram illustrating a method of implementing a 3D image by a parallax barrier method.
Figure 2:
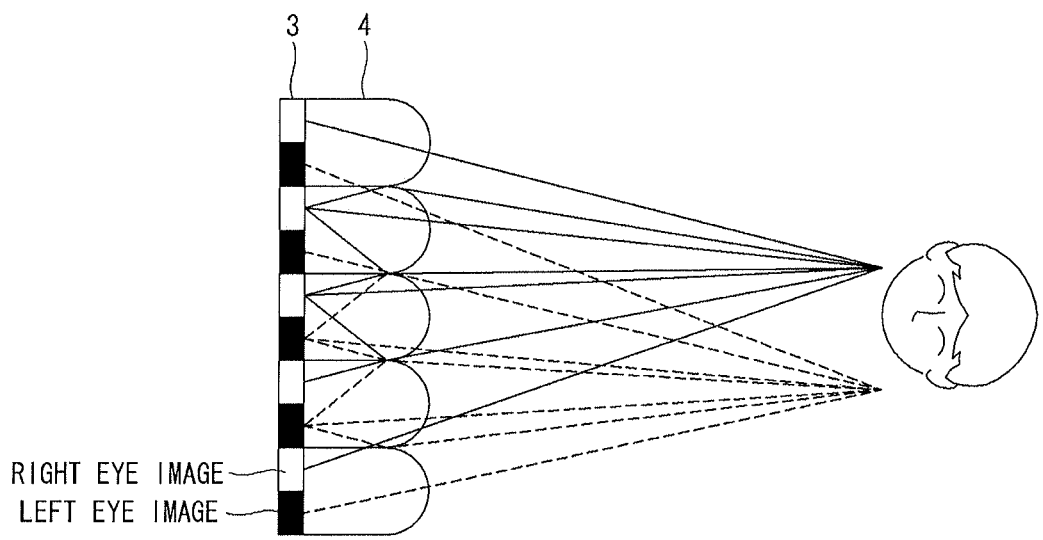
FIG. 2 is a diagram illustrating a method of implementing a 3D image by a lenticular method.

Hereinafter, embodiments of this document will be described in detail with reference to the accompanying drawings. Like reference numerals designate like elements throughout the specification. In the following description, when a detailed description of well-known functions or configurations related to this document is determined to unnecessarily cloud a gist of the present invention, the detailed description thereof will be omitted. In the explanation of the below, 'switchable lens cell' or 'switchable barrier cell' is an example of 'the switchable optical layer'. But, 'the switchable optical layer' is not limited to 'switchable lens cell' or 'switchable barrier cell'.

Names of the respective elements used in the following description are selected for convenience of writing the specification and may be thus different from those in actual products.

Figure 3:
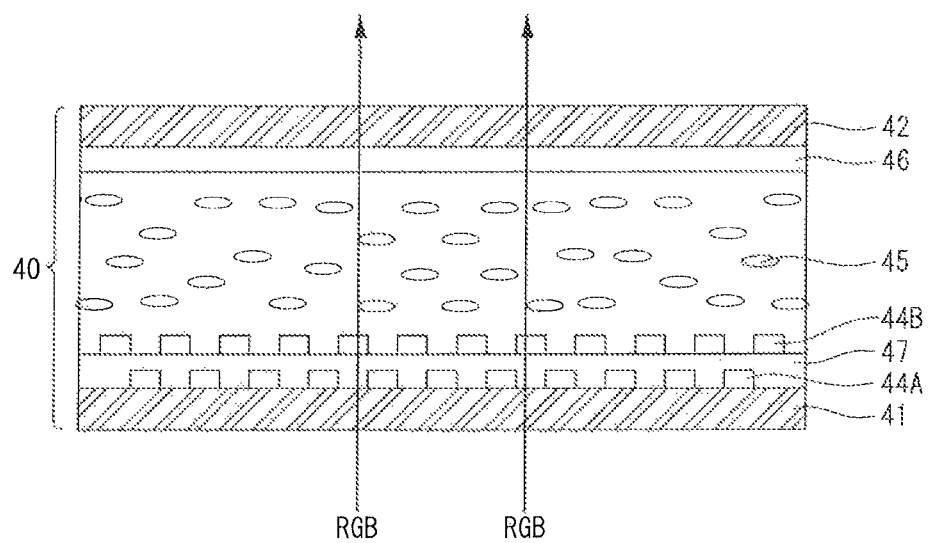
FIG. 3 is a diagram illustrating a method in which a switchable lens cell implements a 2D image.
Figure 4:
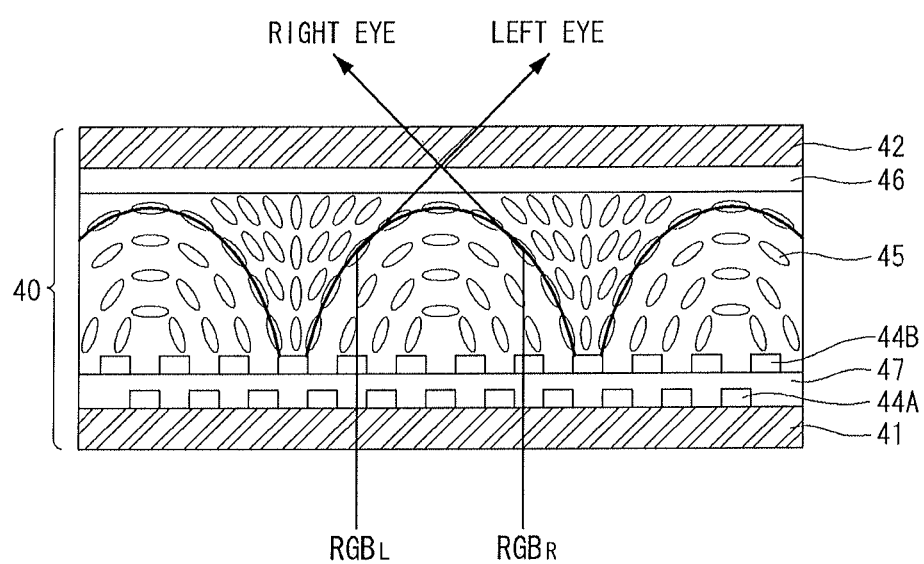
FIG. 4 is a diagram illustrating a method in which a switchable lens cell implements a 3D image.

FIGS. 3 and 4 are cross-sectional views of a switchable lens cell 40 and show methods in which the switchable lens cell 40 implements 2D and 3D images. With reference to FIGS. 3 and 4, the switchable lens cell 40 includes first and second transparent substrates 41 and 42, a common electrode 46, divided electrodes 44A and 44B, and a liquid crystal layer.

The first and second transparent substrates 41 and 42 of the switchable lens cell 40 are opposite to each other. The first and second transparent substrates 41 and 42 may be formed by glass or a film. A plurality of divided electrodes 44A and 44B is patterned on the first transparent substrate 41. The divided electrodes 44A and 44B are formed of two layers, and lower divided electrodes 44A are positioned between the upper divided electrodes 44B. The interval between the divided electrodes is 4 µm or more. An insulating layer 47 is formed between the lower divided electrodes 44A and the upper divided electrodes 44B. The insulating layer 47 prevents the lower divided electrodes 44A and the upper divided electrodes 44B from being short-circuited. The common electrode 46 is formed as a single layer on the second transparent substrate 42.

The switchable lens cell 40 includes the liquid crystal layer between the first and second transparent substrates 41 and 42. The liquid crystal layer has a large amount of liquid crystals, and the liquid crystal 45 is rotated by a voltage difference between the common electrode 46 and the divided electrodes 44A and 44B. The thickness of the liquid crystal layer is determined by a rear surface distance of a lens formed by the liquid crystals 45 when a voltage is applied to the switchable lens cell 40. If the thickness of the liquid crystal layer is reduced, since an amount of liquid crystals injected into the liquid crystal layer is also reduced, manufacturing costs can be decreased. This will be described later with reference to FIG. 5.

As shown in FIG. 3, in implementing a 2D image, the liquid crystal 45 is not rotated since a voltage difference between the common electrode 46 and the divided electrodes 44A and 44B of the switchable lens cell 40 is not substantially generated. Therefore, light is transmitted through the switchable lens cell 40 without being refracted as it is, and a user views a 2D image with no binocular parallax.

Like in FIG. 4, in implementing a 3D image, a voltage difference between the common electrode 46 and the divided electrodes 44A and 44B of the switchable lens cell 40 is generated due to an applied voltage. The liquid crystal 45 is rotated by a certain level due to the generated voltage difference. In order to implement the 3D image using the switchable lens cell 40, it is important to what degree the liquid crystal is rotated by applying a certain voltage to the liquid crystal 45. The switchable lens cell 40 is formed by calculating an optimal voltage applied to the liquid crystal 45 after the width of the electrode and the interval between the electrodes in the lens are determined in consideration of the rotatable movement of the liquid crystals 45. Voltages for the divided electrodes 44A and 44B gradually vary such that a voltage difference for the liquid crystal 45 positioned at the edge of the lens is greater than a voltage difference for the liquid crystal 45 positioned at the center of the lens.

As shown in FIG. 4, the liquid crystals 45 of the switchable lens cell 40 are rotated due to the voltage differences between the voltage applied to the common electrode 46 and voltages applied to the respective divided electrodes 44A and 44B in order to implement the 3D image. The voltage applied to the common electrode 46 is constant, but the voltages applied to the respective divided electrodes 44A and 44B are different from each other, and thus a voltage difference for the liquid crystals 45 differs from each other. Therefore, the liquid crystals 45 are rotated to form a convex lens shape according to the voltage differences as shown in FIG. 4. The light for a right image RGB ($RGB_R$) is refracted toward the right eye of a user by the liquid crystal layer of the switchable lens cell 40 which has the convex lens shape. The light for a left image RGB ($RGB_L$) is refracted toward the left eye of the user by the liquid crystal layer of the switchable lens cell 40 which has the convex lens shape. Therefore, the left and right eyes of the user can recognize the parallax, and thereby the 3D image is implemented.

Figure 5:
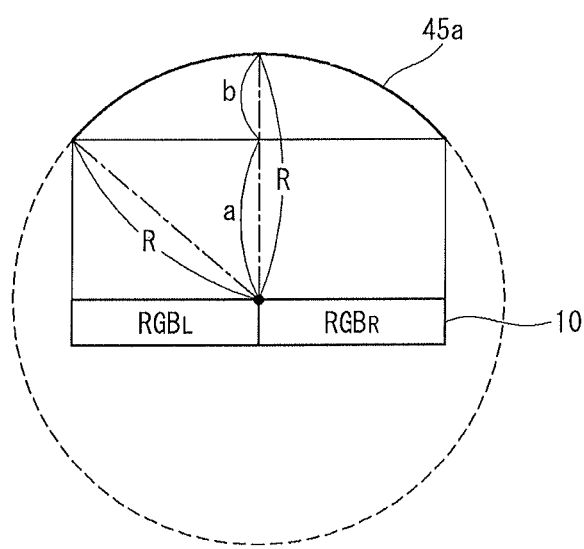
FIG. 5 is a diagram illustrating a relationship between the rear surface distance of the switchable lens cell and the thickness of a liquid crystal layer.

FIG. 5 is a diagram illustrating the rear surface distance a of the switchable lens cell 40 and the thickness b of the liquid crystal layer. With reference to FIG. 5, the distance R between the pixel array cell 10 and the lens 45a is defined by the sum of the rear surface distance a and the thickness b of the liquid crystal layer. The rear surface distance a indicates a distance between the pixel array cell 10 and the liquid crystal layer of the switchable lens cell 40. If the distance R between the pixel array cell 10 and the lens 45a is decreased, the rear surface distance a and the thickness b of the liquid crystal layer is decreased at the same ratio. The lens 45a is formed by the liquid crystals 45 of the switchable lens cell 40.

In this document, it is possible to reduce one of mother substrates 30 of the display panel by the use of a transparent both-sided adhesive film 70. Therefore, since the distance R between the pixel array cell 10 and the lens 45a is decreased, the rear surface distance a and the thickness b of the liquid crystal layer is decreased. As a result, the thickness b of the liquid crystal layer can be implemented to be thinner. According to this document, it is possible to decrease costs by reducing an amount of the liquid crystals 45 injected into the liquid crystal layer.

Figure 6:
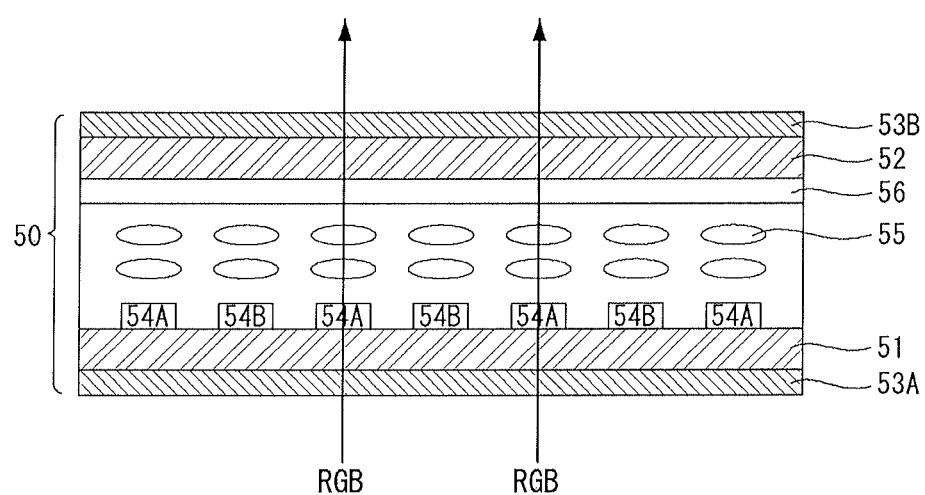
FIG. 6 is a diagram illustrating a method in which a switchable barrier cell implements a 2D image.
Figure 7:
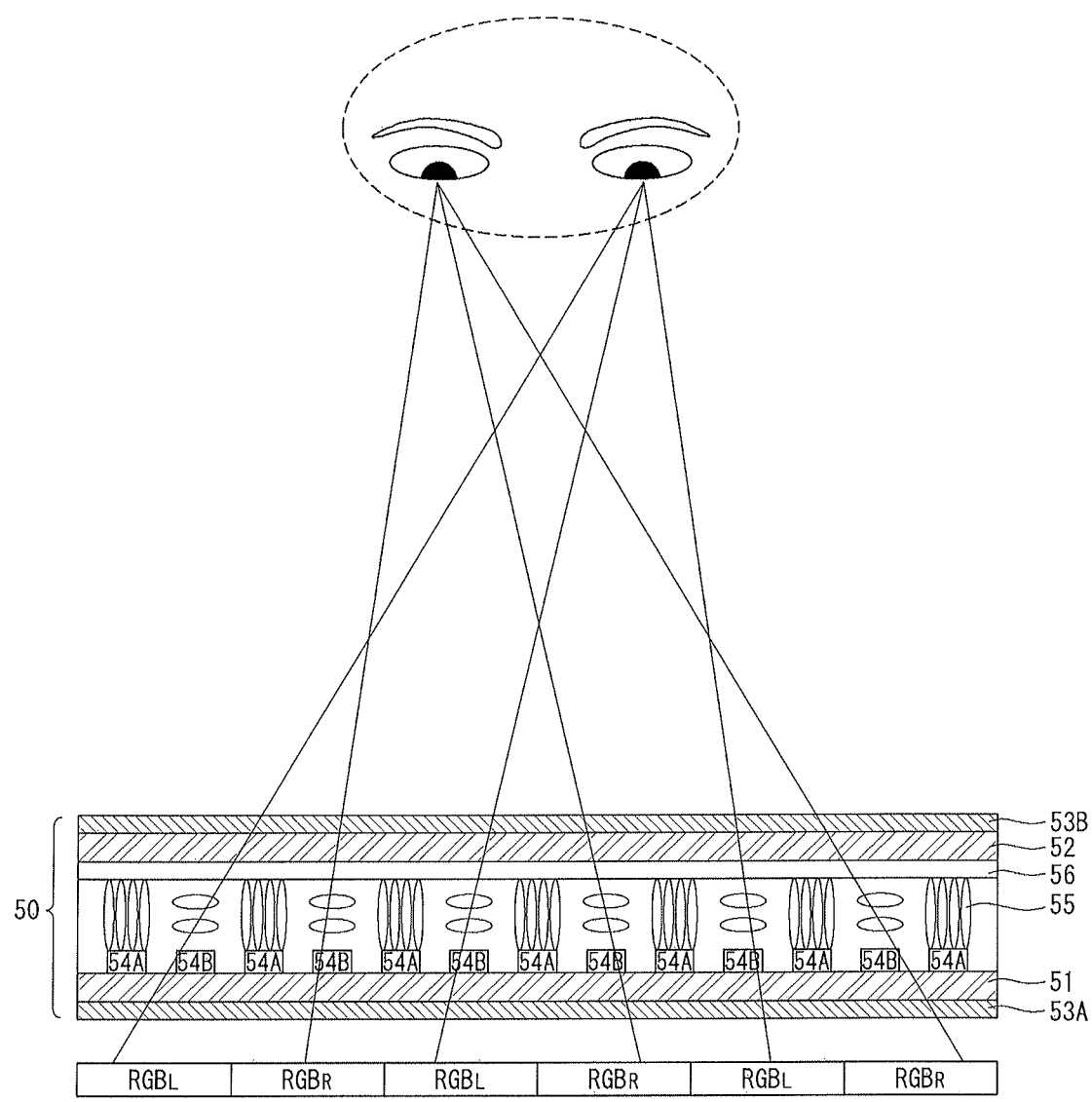
FIG. 7 is a diagram illustrating a method in which the switchable barrier cell implements a 3D image.

FIGS. 6 and 7 are diagrams illustrating methods in which a switchable barrier cell 50 implements 2D and 3D images. With reference to FIGS. 6 and 7, the switchable barrier cell 50 includes first and second transparent substrates 51 and 52, a common electrode 56, divided electrodes 54A and 54B, and a liquid crystal layer.

The first and second transparent substrates 51 and 52 of the switchable barrier cell 50 are opposite to each other. The first and second transparent substrates 51 and 52 may be formed by glass or a film. A plurality of divided electrodes 54A and 54B is patterned on the first transparent substrate 51. The common electrode 56 is formed as a single layer on the second transparent substrate 52.

The switchable barrier cell 50 includes the liquid crystal layer between the first and second transparent substrates 51 and 52. The liquid crystal layer has a large amount of liquid crystals, and the liquid crystal 55 is rotated by a voltage difference between the common electrode 56 and the divided electrodes 54A and 54B.

Like in FIG. 6, in implementing a 2D image, the liquid crystal 55 is not rotated since a voltage difference between the common electrode 56 and the divided electrodes 54A and 54B of the switchable barrier cell 50 is not substantially generated. Therefore, light is transmitted through the switchable barrier cell 50 without being refracted as it is, and a user views a 2D image with no binocular parallax.

Like in FIG. 7, in implementing a 3D image, a voltage difference between the common electrode 56 and the divided electrodes 54A and 54B of the switchable barrier cell 50 is generated due to an applied voltage. Voltages applied to the common electrode 56 and the 2n-th (where n is a positive number) electrodes 54B do not generate voltage differences, and thus the liquid crystals 55 positioned between the common electrode 56 and the 2n-th electrodes 54B are not rotated. Voltages applied to the common electrode 56 and the (2n−1)-th electrodes 54A generate voltage differences. Therefore, the liquid crystals 55 positioned between the common electrode 56 and the (2n−1)-th electrodes 54A are rotated by 90 degrees.

A first polarizer 53A is attached to the first transparent substrate 51 of the switchable barrier cell 50. A second polarizer 53B which intersects the first polarizer 53A is attached to the second transparent substrate 52.

The liquid crystals 55 positioned between the common electrode 56 and the 2n-th electrodes 54B are not rotated. Light which has been transmitted through the first polarizer 53A can be transmitted through the second polarizer 53B since the light travels to be polarized by the arrangement of the liquid crystals 55.

The liquid crystals 55 positioned between the common electrode 56 and the (2n−1)-th electrodes 54A are rotated by 90 degrees. Light which has been transmitted through the first polarizer 53A is blocked by the second polarizer 53B since the light travels without being polarized along the arrangement of the liquid crystals 55. Therefore, the region between the common electrode 56 and the (2n−1)-th electrodes 54A functions as a barrier which blocks light.

Due to the region blocking light from the liquid crystal layer of the switchable barrier cell 50, the light for a right image RGB ($RGB_R$) travels toward the right eye of a user and the light for a left image RGB (RGB) travels toward the left eye of the user. Therefore, the left and right eyes of the user can recognize the parallax, and thereby the 3D image is implemented.

Figure 8:
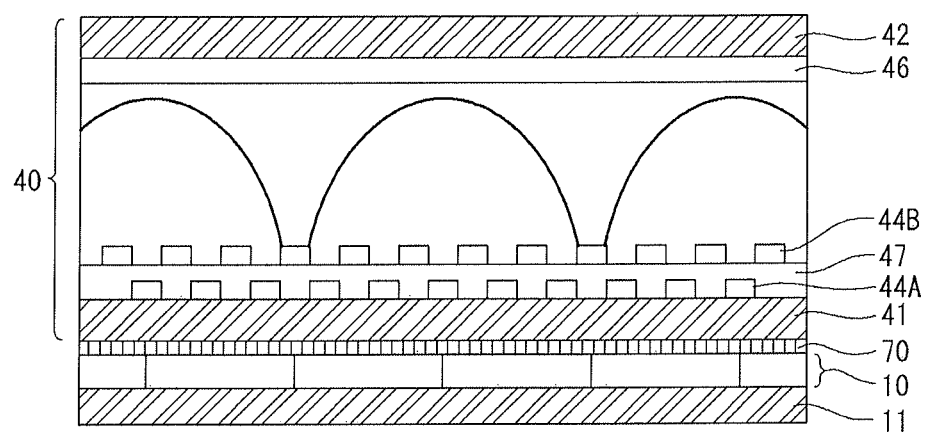
FIG. 8 is a diagram illustrating a stereoscopic image display device in which a pixel array cell and a switchable lens cell are joined to each other according to a first embodiment of this document.

FIG. 8 is a diagram illustrating a stereoscopic image display device in which the pixel array cell is joined to the switchable lens cell according to a first embodiment of this document. In FIG. 8, the stereoscopic image display device according to the first embodiment includes the pixel array cell 10, the switchable lens cell 40, and a transparent both-sided adhesive film 70.

A display device according to an embodiment of this document may be an organic light emitting diode (OLED) display or an electrophoresis display (EPD). This document describes the OLED display as an example, but is not limited to the OLED display.

A plurality of pixels is arranged in the pixel array cell 10 in a matrix. The pixel array cell 10 is provided with data lines for supplying data voltages to the pixels and scan lines for supplying scan pulses to the pixels. Each of the pixels is supplied with an analog data signal from the data line and emits light corresponding to the data signal when the scan pulse is supplied to the scan line. In the OLED display, organic or inorganic protective layers may be formed of multiple layers on the pixel array cell 10 in order to protect organic materials of the pixel array from moisture and air.

The switchable lens cell 40 has been described in detail with reference to FIGS. 3 and 4.

The transparent both-sided adhesive film 70 joins the pixel array cell 10 to the switchable lens cell 40 between the pixel array cell 10 and the switchable lens cell 40. More specifically, the transparent both-sided adhesive film 70 joins organic or inorganic protective layer of the pixel array cell 10 to the first transparent substrate 41 of the switchable lens cell 40. Details of the transparent both-sided adhesive film 70 will be described later with reference to FIGS. 10 and 11.

Figure 9:
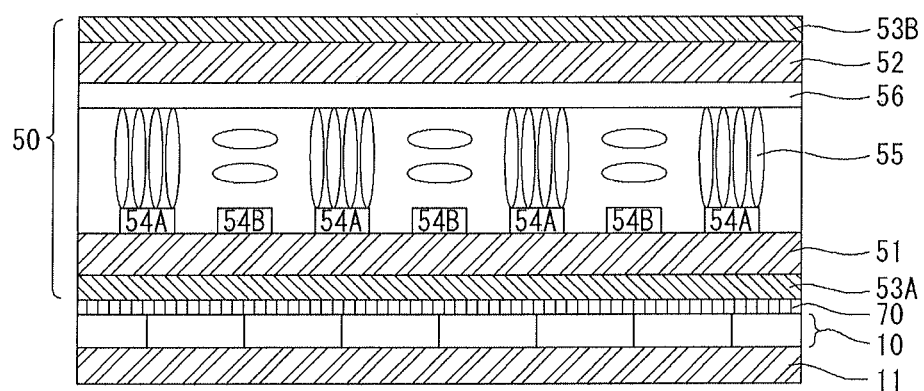
FIG. 9 is a diagram illustrating a stereoscopic image display device in which a pixel array cell and a switchable lens cell are joined to each other according to a second embodiment of this document.

FIG. 9 is a diagram illustrating a stereoscopic image display device in which the pixel array cell 10 is joined to the switchable barrier cell 50 according to a second embodiment of this document. In FIG. 9, the stereoscopic image display device according to the second embodiment includes the pixel array cell 10, the switchable barrier cell 50, and the transparent both-sided adhesive film 70.

The pixel array cell 10 has been described in detail with reference to FIG. 8. The switchable barrier cell 50 has been described in detail with reference to FIGS. 6 and 7. The transparent both-sided adhesive film 70 joins the pixel array cell 10 to the switchable barrier cell 50 between the pixel array cell 10 and the switchable barrier cell 50. More specifically, the transparent both-sided adhesive film 70 joins an organic or inorganic protective layer of the pixel array cell 10 to the first transparent substrate 51 of the switchable barrier cell 50. Details of the transparent both-sided adhesive film 70 will be described later with reference to FIGS. 10 and 11.

First and second adhesive layers 73A and 73B of the transparent both-sided adhesive film 70 may be applied on the entire transparent both-sided adhesive film 70 or may be applied on thereon so as to correspond to the size of the pixel array cell 10 and the switchable lens cell 40 or the switchable barrier cell 50.

Figure 10:
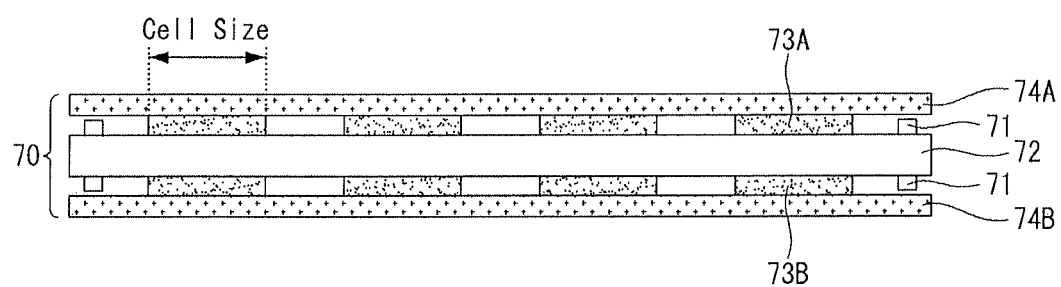
FIG. 10 is a diagram illustrating a transparent both-sided adhesive film and on which first and second adhesive layers are applied so as to correspond to the size of the pixel array cell and the switchable lens/barrier cell.

FIG. 10 is a diagram illustrating the transparent both-sided adhesive film 70 on which the adhesive layers 73A and 73B are applied so as to correspond to the size of the pixel array cell 10 and the switchable lens cell 40 or the switchable barrier cell 50. Referring to FIG. 10, the transparent both-sided adhesive film 70 includes a film base 72, the first and second adhesive layers 73A and 73B, and first and second protective films 74A and 74B.

The first adhesive layer 73A is formed on the first adhesive surface of the film base 72. The first adhesive layer 73A is protected by the first protective film 74A. The second adhesive layer 73B is formed on the second adhesive surface of the film base 72 opposite to the first adhesive surface. The second adhesive layer 73B is protected by the second protective film 74B.

The transparent both-sided adhesive film 70 is used to join the pixel array cell 10 to the switchable lens cell 40 or the switchable barrier cell 50, and the first and second adhesive layers 73A and 73B are formed so as to correspond to the size of the pixel array cell 10 and the switchable lens cell 40 or the switchable barrier cell 50. The first adhesive layer 73A faces the switchable lens cell 40 or the switchable barrier cell 50 of the switchable lens/barrier cell mother substrate 20, and the second adhesive layer 73B faces the pixel array cell 10 of the pixel array cell mother substrate 30.

As shown in FIG. 10, since the transparent both-sided adhesive film 70 on which the first and second adhesive layers 73A and 73B are applied is required to be aligned in the joining process with the pixel array cell mother substrate 30 or the switchable lens/barrier cell mother substrate 20, third alignment keys 71 are necessary. The third alignment keys 71 are used to join the transparent both-sided adhesive film 70 to the switchable lens/barrier cell mother substrate 20.

Figure 11:
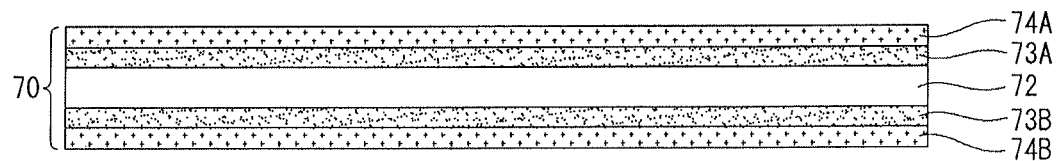
FIG. 11 is a diagram illustrating a transparent both-sided adhesive film in which first and second adhesive layers are applied on the entire transparent both-sided adhesive film.

FIG. 11 is a diagram illustrating the transparent both-sided adhesive film 70 in which the first and second adhesive layers 73A and 73B are applied on the entire transparent both-sided adhesive film 70. Referring to FIG. 11, the first and second adhesive layers 73A and 73B are not formed to correspond to the size of the pixel array cell 10 and the switchable lens cell 40 or the switchable barrier cell 50. But, the first and second adhesive layers 73A and 73B are formed on the entire transparent both-sided adhesive film 70.

The entire transparent both-sided adhesive film 70 is joined to the pixel array cell mother substrate 30 and the switchable lens/barrier cell mother substrate 20, and thus the transparent both-sided adhesive film 70 does not require alignment keys.

On the other hand, instead of joining the pixel array cell mother substrate 30 provided with the pixel array cell 10 to the switchable lens/barrier cell mother substrate 20 provided with the switchable lens cell 40 or the switchable barrier cell 50, the pixel array cell 10 may be joined to the switchable lens cell 40 or the switchable barrier cell 50. The alignment error when the pixel array cell 10 is joined to the switchable lens cell 40 or the switchable barrier cell 50 is 20 μm or less.

However, this method has a problem in that the pixel array cell 10 and the switchable lens cell 40 or the switchable barrier cell 50 are difficult to align.

Figure 12:
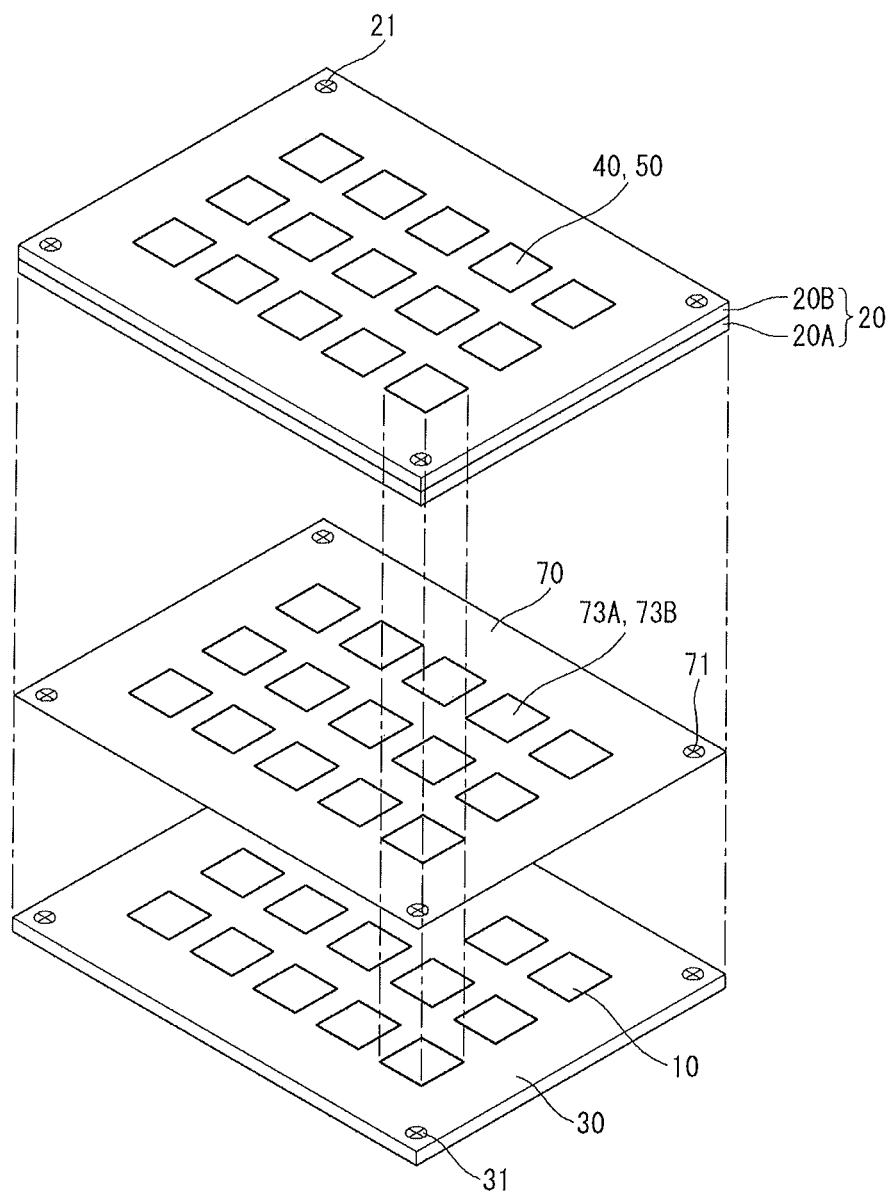
FIG. 12 is a diagram illustrating a process for aligning alignment keys of a pixel array cell mother substrate, alignment keys of a transparent both-sided adhesive film, and alignment keys of a switchable lens/barrier cell mother substrate so as to be joined together.

FIG. 12 is a diagram illustrating a joining process performed by aligning alignment keys 31 of the pixel array cell mother substrate 30, alignment keys of the transparent both-sided adhesive film 70, and the alignment keys 21 of the switchable lens/barrier cell mother substrate 20.

In FIG. 12, the pixel array cell mother substrate 30 includes at least one pixel array cell 10. The first alignment keys 31 are formed in the corners of the pixel array cell mother substrate 30 in order to facilitate the alignment when the pixel array cell mother substrate 30 is aligned with other mother substrates.

The switchable lens/barrier cell mother substrate 20 includes first and second mother substrates 20A and 20B opposite to each other. The electrodes 44A, 44B, 46, 54A, 54B and 56 are formed in a cell region corresponding to the pixel array cell 10 in the first and second mother substrates 20A and 20B. The liquid crystal layer is formed in the cell region between the first and second mother substrates 20A and 20B corresponding to the pixel array cell 10.

Figure 15:
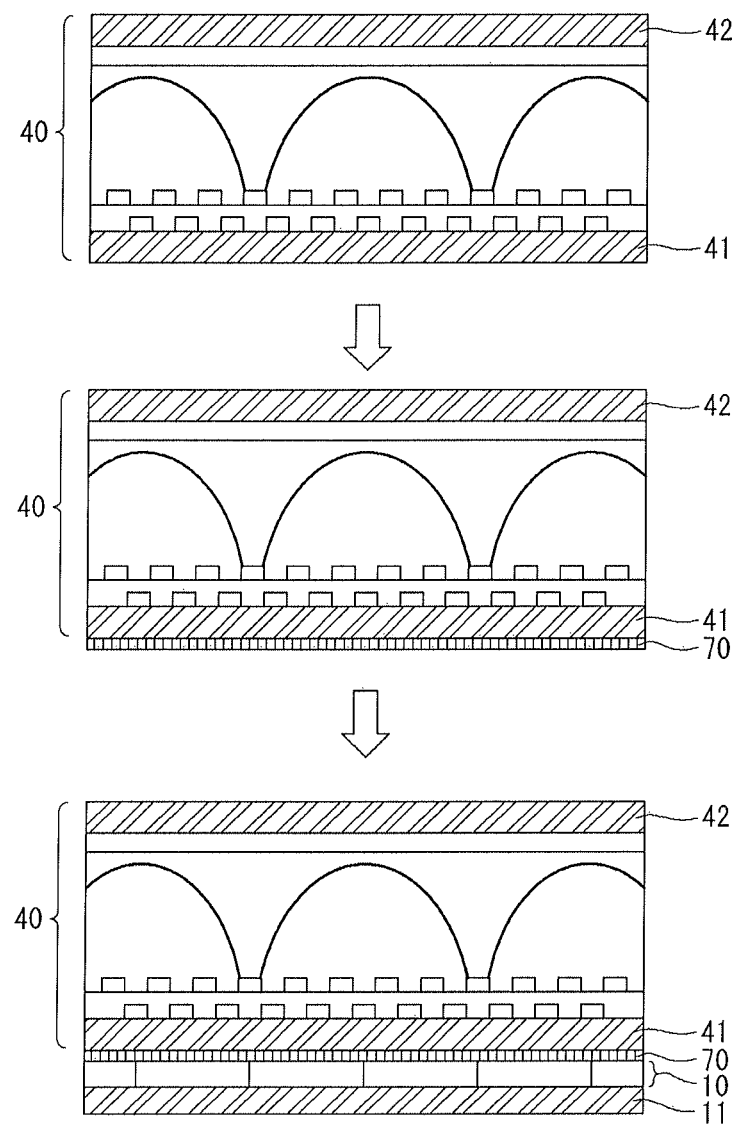
FIG. 15 is a diagram illustrating in detail a procedure in which the pixel array cell and the switchable lens cell are joined to each other.
Figure 17:
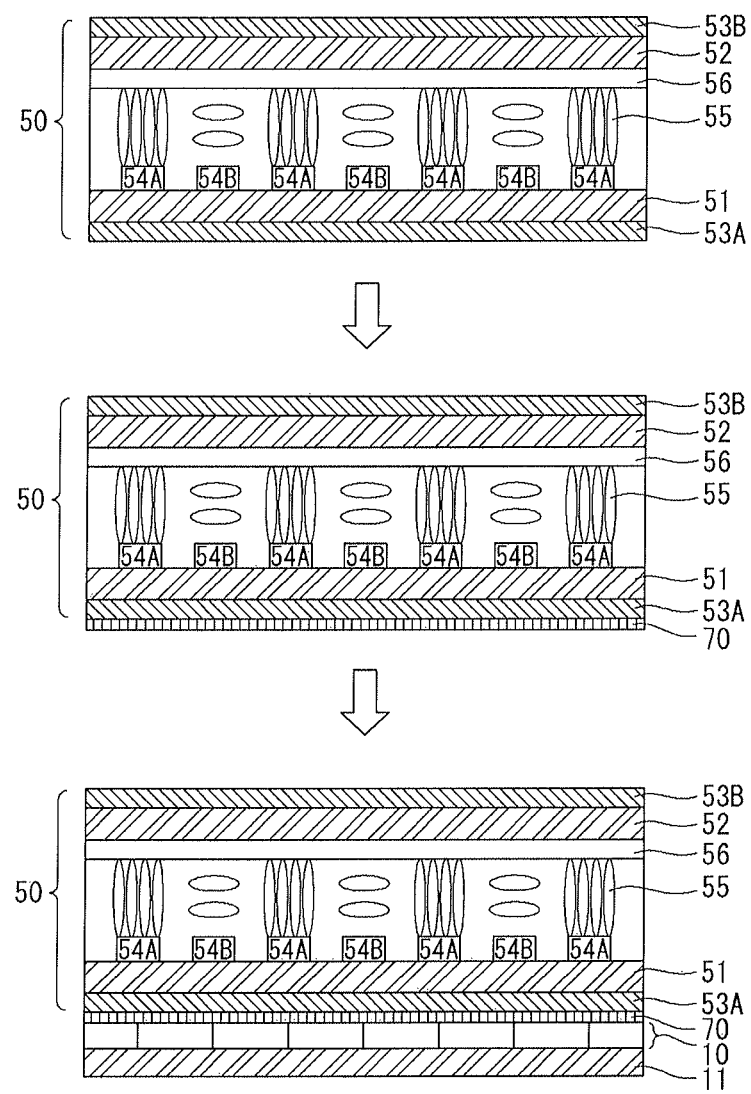
FIG. 17 is a diagram illustrating in detail a procedure in which the pixel array cell and the switchable barrier cell are joined to each other.

With reference to FIG. 15 or 17, the first and the second transparent substrates 41, 42, 51 and 52 of the switchable lens cell 40 or the switchable barrier cell 50 indicate that the first and second mother substrates 20A and 20B of the switchable lens/barrier cell mother substrate 20 are divided into the cell regions corresponding to the pixel array cells 10. The switchable lens cell 40 or the switchable barrier cell 50 includes the electrodes 44A, 44B, 46, 54A, 54B and 56, the liquid crystal layer, and the first and second transparent substrates 41, 42, 51 and 52.

The switchable lens/barrier cell mother substrate 20 includes at least one switchable lens cell 40 or switchable barrier cell 50. The alignment keys 21 for facilitating the alignment are formed in the corners of the switchable lens/barrier cell mother substrate 20.

The transparent both-sided adhesive film 70 used to join the pixel array cell mother substrate 30 to the switchable lens/barrier cell mother substrate 20 is placed between the pixel array cell mother substrate 30 and the switchable lens/barrier cell mother substrate 20. The transparent both-sided adhesive film 70 includes at least one pair of first and second adhesive layers 73A and 73B. The first and second adhesive layers 73A and 73B are formed to have substantially the same size as the pixel array cell 10 and the switchable lens cell 40 or the switchable barrier cell 50. The third alignment keys 71 are also formed in the corners of the transparent both-sided adhesive film 70 in order to facilitate the alignment.

Figure 13:
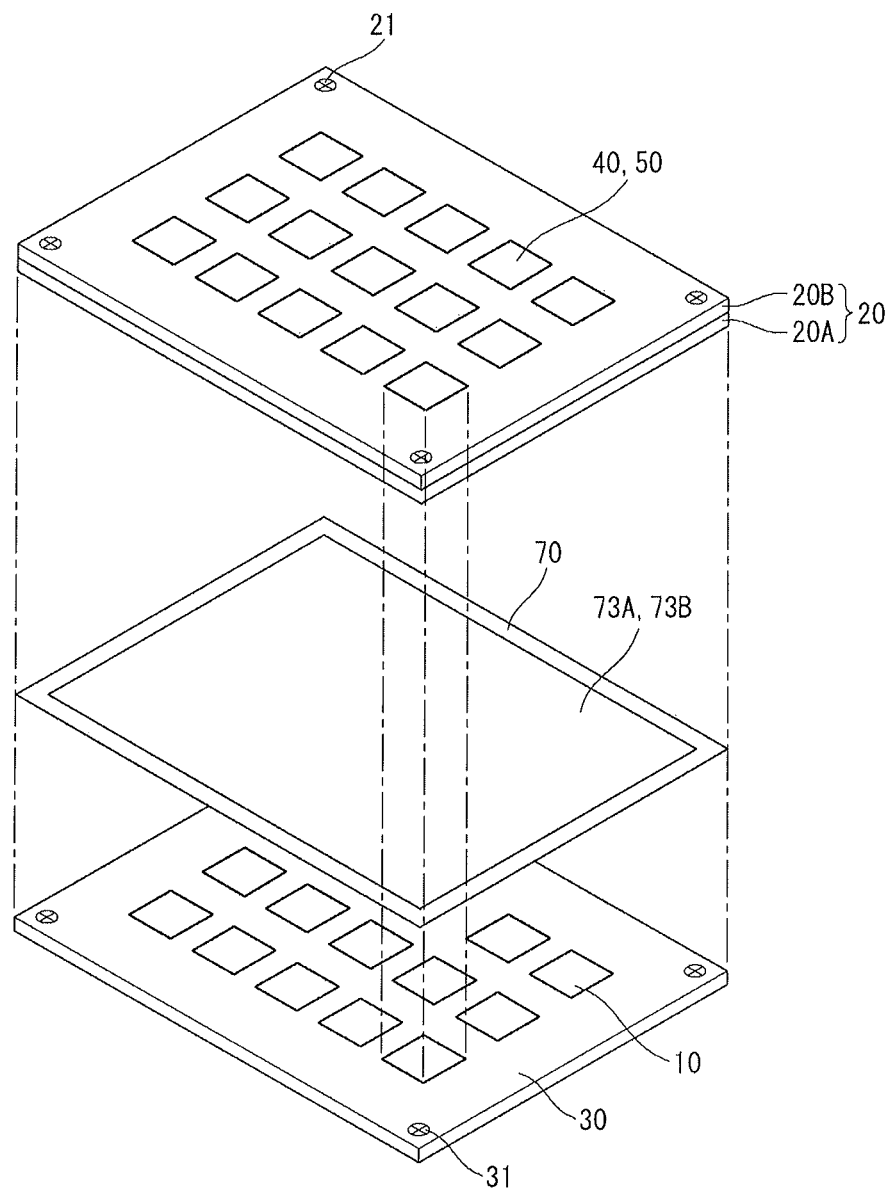
FIG. 13 is a diagram illustrating a process for aligning alignment keys of a pixel array cell mother substrate and alignment keys of a switchable lens/barrier cell mother substrate so as to be joined together.

FIG. 13 is a diagram illustrating a joining process performed by aligning the alignment keys 31 of the pixel array cell mother substrate 30 with the alignment keys 21 of the switchable lens/barrier cell mother substrate 20. The first and second adhesive layers 73A and 73B are formed on the entire transparent both-sided adhesive film 70. Therefore, the transparent both-sided adhesive film 70 is not required to be aligned, and thus the transparent both-sided adhesive film 70 does not require alignment keys.

Figure 14:
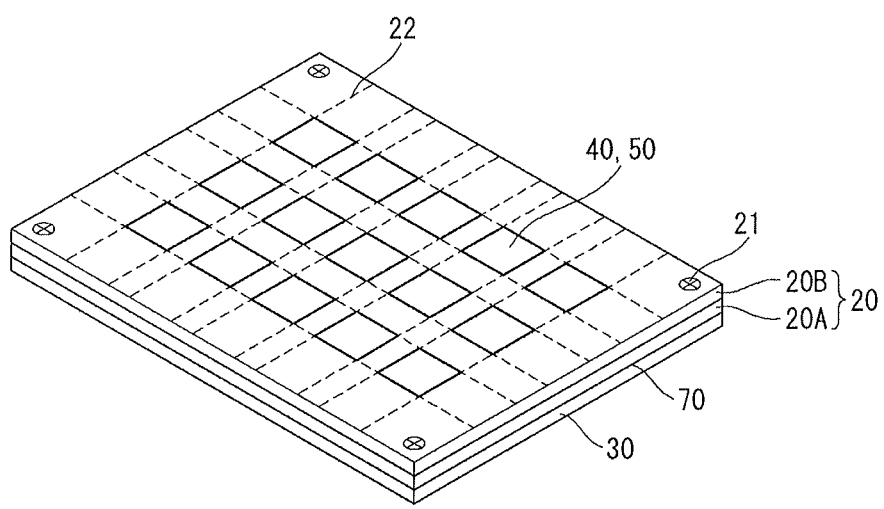
FIG. 14 is a diagram illustrating joining of the pixel array cell mother substrate to the switchable lens/barrier cell mother substrate.

FIG. 14 is a diagram illustrating a state where the pixel array cell mother substrate 30 is joined to the switchable lens/barrier cell mother substrate 20. The joined the pixel array cell mother substrate 30 and the switchable lens/barrier cell mother substrate 20 are cut along the cut lines 22 so as to finish the joining between the pixel array cell 10 and the switchable lens cell 40 or the switchable barrier cell 50. The cutting may be performed by a scribing process or the like.

FIG. 15 is a diagram illustrating in detail a procedure where the pixel array cell 10 is joined to the switchable lens cell 40.

For better understanding of this document, FIG. 15 shows a procedure where a single pixel array cell 10 is joined to a single switchable lens cell 40, not joining between the mother substrates. With reference to FIG. 15, a process for joining the pixel array cell 10 to the switchable lens cell 40 is as follows.

In a first step, the pixel array cell mother substrate 30 including at least one pixel array cell 10 having a plurality of pixels used to implement 2D and 3D images is formed. The pixel array cell mother substrate 30 is provided with the first alignment keys 31.

In a second step, the switchable lens cell mother substrate 20 including at least one switchable lens cell 40 corresponding to the pixel array cell 10 is formed. The switchable lens cell mother substrate 20 is provided with the second alignment keys 21.

In a third step, the transparent both-sided adhesive film 70 which joins the pixel array cell mother substrate 30 to the switchable lens cell mother substrate 20 between the pixel array cell mother substrate 30 and the switchable lens cell mother substrate 20 is formed. If the first and second adhesive layers 73A and 73B of the transparent both-sided adhesive film 70 are formed to correspond to the size of the pixel array cell 10 and the switchable lens cell 40, the third alignment keys 71 may be formed on the transparent both-sided adhesive film 70 for the alignment.

In a fourth step, the first adhesive layer 73A of the transparent both-sided adhesive film 70 is joined to the switchable lens cell mother substrate 20. The fourth step may include a step of peeling the first protective film 74A of the first adhesive layer 73A from the transparent both-sided adhesive film 70 and a step of joining the transparent both-sided adhesive film 70 to the switchable lens cell mother substrate 20 by attaching the first adhesive layer 73A to the switchable lens cell 40.

In a fifth step, the pixel array cell mother substrate 30 and the switchable lens cell mother substrate 20 are aligned with each other using the first and second alignment keys 21 and 31, and the second adhesive layer 73B of the transparent both-sided adhesive film 70 is joined to the switchable lens cell mother substrate 20. The fifth step may include a step of peeling the second protective film 74B of the second adhesive layer 73B from the transparent both-sided adhesive film 70 and a step of joining the pixel array cell mother substrate 30 to the switchable lens cell mother substrate 20 by attaching the second adhesive layer 73B to the switchable lens cell 40.

The process for joining the pixel array cell 10 to the switchable lens cell 40 may include a sixth step of cutting the joined mother substrates along the pixel array cell 10 and the switchable lens cell 40.

The joining process of the transparent both-sided adhesive film 70 in the fourth and fifth steps is required to apply both heat and pressure so as not to generate foam and may be performed by a laminating process. The joining process of the transparent both-sided adhesive film 70 has a characteristic of a low temperature process in a range from about 70 degrees to about 150° C. due to the temperature characteristic of the liquid crystals of the switchable lens cell 40. The transparent both-sided adhesive film 70 is not properly joined at a temperature lower than 70 degrees, and the liquid crystals are cured at a temperature higher than 150° C. and thus the switchable lens cell 40 cannot be appropriately operated. The pressure is caused by self weight of a roller and is a pressure which is typically applied during the laminating process.

As the joining process, there is known a method of joining glass to glass with frit glass. A process using the frit glass is a high temperature process which is performed at a temperature of 400 degrees or more. However, since the liquid crystals are cured at a temperature of about 150° C. or more, if the liquid crystals 45 exist like in the switchable lens cell 40 or the switchable barrier cell 50, the frit glass joining process may be impossible.

Figure 16:
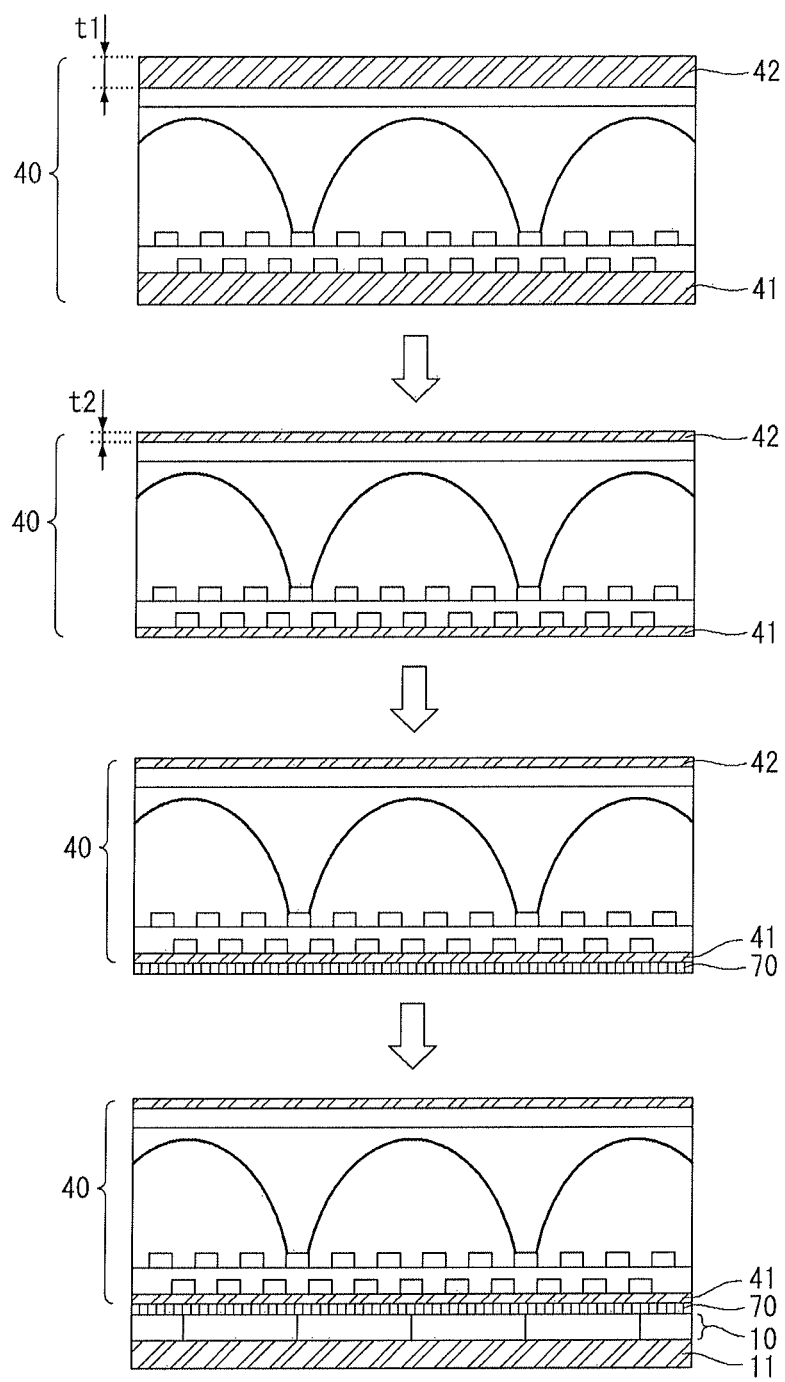
FIG. 16 is a diagram in which a step of etching the switchable lens cell is added to FIG. 15.

FIG. 16 is a diagram in which a step of etching the switchable lens cell 40 is added to FIG. 15. In the second step, the first and second mother substrate may be etched to have the thickness of about 20 μm to about 500 μm. As described with reference to FIG. 5, if the distance R between the pixel array cell 10 and the switchable lens cell 40 is decreased, there is an advantage in that the thickness of the liquid crystal layer is reduced and thus the costs are decreased.

Referring to FIG. 16, the thickness t1 of each of the first and second transparent substrates 41 and 42 of the switchable lens cell 40 is about 0.5 mm. The thickness t2 of each of the etched first and second transparent substrates 41 and 42 of the switchable lens cell 40 is about 20 μm to about 500 μm. If the thickness of the first and second transparent substrates 41 and 42 is smaller than 20 μm, it leads to failing to function as substrates due to weakness in water-vapor permeance. The etching may be performed by a wet etching process.

FIG. 17 is a diagram illustrating in detail a procedure where the pixel array cell 10 is joined to the switchable barrier cell 50. For better understanding of this document, FIG. 17 shows a procedure where a single pixel array cell 10 is joined to a single switchable barrier cell 50, not joining between the mother substrates.

The process for joining the pixel array cell 10 to the switchable barrier cell 50 is substantially the same as the process for joining the pixel array cell 10 to the switchable lens cell 40. However, since the switchable barrier cell 50 uses the polarization characteristics of the liquid crystal 55, a step of attaching the polarizers 53A and 53B to the first and second transparent substrates 51 and 52 of the switchable barrier cell 50 is added.

Figure 18:
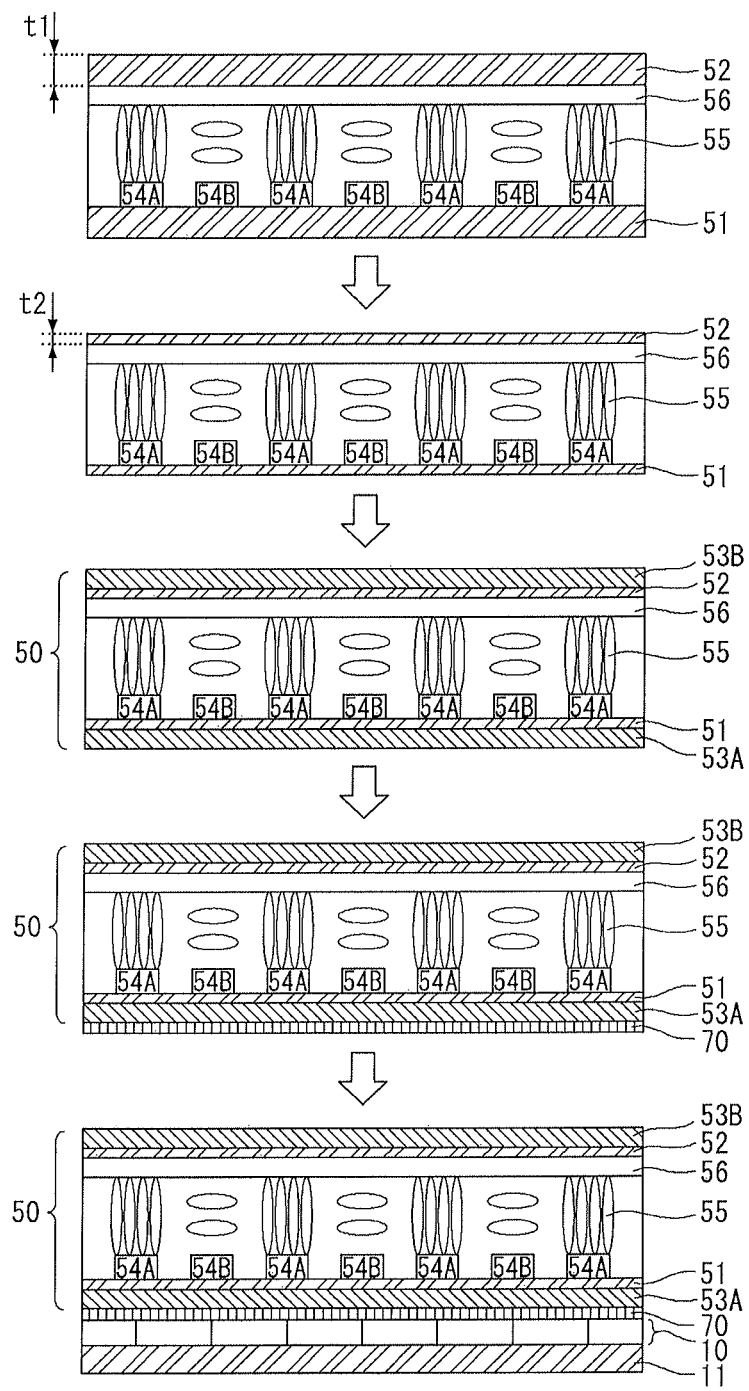
FIG. 18 is a diagram in which a step of etching the switchable barrier cell is added to FIG. 17.

FIG. 18 is a diagram in which a step of etching the switchable barrier cell 50 is added to FIG. 17. In the second step, the first and second mother substrates 20A and 20B may be etched to have the thickness of about 20 μm to about 500 μm. Referring to FIG. 18, the thickness t1 of each of the first and second transparent substrates 51 and 52 of the switchable barrier cell 50 is about 0.5 mm. The thickness t2 of each of the etched first and second transparent substrates 41 and 42 of the switchable barrier cell 50 is about 20 μm to about 500 μm. If the thickness of the first and second transparent substrates 51 and 52 is smaller than 20 μm, it leads to failing to function as substrates due to weakness in water-vapor permeance. The etching may be performed by a wet etching process.

Figure 19:
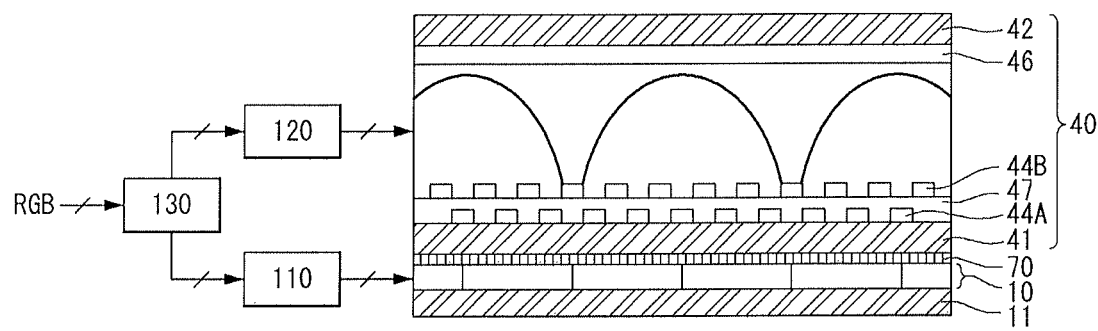
FIG. 19 is a diagram illustrating a stereoscopic image display device implemented by the switchable lens cell shown in FIG. 8.

FIG. 19 is a diagram illustrating a stereoscopic image display device implemented using the switchable lens cell 40 shown in FIG. 8. Referring to FIG. 19, the stereoscopic image display device of this document includes the pixel array cell 10, the switchable lens cell 40, a pixel array cell driver 110, a switchable lens cell driver 120, and a controller 130.

The pixel array cell 10 and the switchable lens cell 40 are the same as described above.

The pixel array cell driver 110 supplies data voltages to the data lines of the pixel array cell 10 and supplies scan pulses to the scan lines so as to drive the pixel array cell 10. The pixel array cell driver 110 includes a data driving circuit and a scan driving circuit. The scan driving circuit supplies the scan pulses to the scan lines and sequentially drives the scan lines. The data driving circuit converts digital data signals output from the controller 130 into analog data signals. The data driving circuit supplies the analog data signals to the data lines each time the scan pulses are supplied.

The switchable lens cell driver 120 supplies driving voltages to the common electrode 46 and the divided electrodes 44A and 44B of the switchable lens cell 40. The switchable lens cell driver 120 supplies different driving voltages in 2D and 3D images under the control of the controller 130. When the 2D image is implemented, the switchable lens cell driver 120 supplies the driving voltages so as not to generate a substantial voltage difference between the common electrode 46 and the divided electrodes 44A and 44B. When the 3D image is implemented, the switchable lens cell driver 120 supplies the driving voltages so as to generate the substantial voltage difference between the common electrode 46 and the divided electrodes 44A and 44B. As described with reference to FIG. 4, different voltages are applied to the respective divided electrodes 44A and 44B such that rotation angles of the liquid crystals 45 become different depending on positions of the liquid crystals.

The controller 130 generates data control signals used to control the data driving circuit of the pixel array cell driver 110 and scan control signals used to control the scan driving circuit of the pixel array cell driver 110 by the use of a plurality of synchronization signals. The data control signals generated by the controller 130 are supplied to the data driving circuit so as to control the data control circuit. The scan control signals generated by the controller 130 are supplied to the scan driving circuit so as to control the scan driving circuit.

The controller 130 outputs a signal which controls the switchable lens cell driver 120 to generate different driving voltages in the 2D and 3D images. The switchable lens cell driving control signal output from the controller 130 is supplied to the switchable lens cell driver 120 so as to the control the switchable lens cell driver 120.

Figure 20:
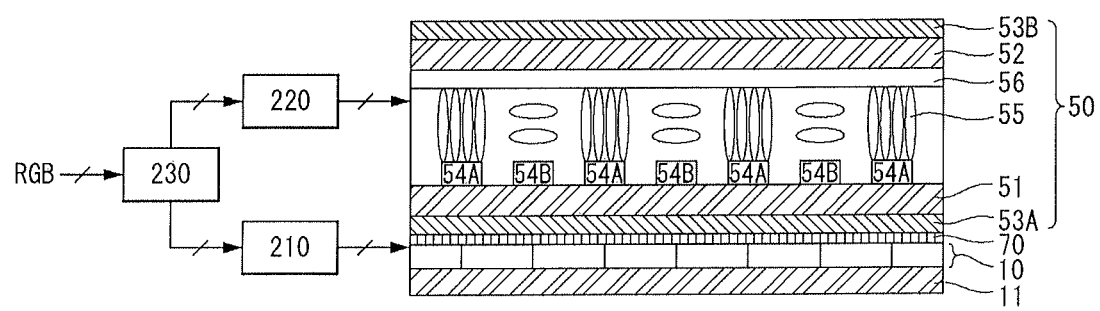
FIG. 20 is a diagram illustrating a stereoscopic image display device implemented by the switchable barrier cell shown in FIG. 9.

FIG. 20 is a diagram illustrating a stereoscopic image display device implemented using the switchable barrier cell 50 shown in FIG. 9. The switchable barrier cell driver 130 supplies driving voltages to the common electrode 56 and the divided electrodes 54A and 54B of the switchable barrier cell 50. The switchable barrier cell driver 220 supplies different driving voltages in 2D and 3D images. When the 2D image is implemented, the switchable barrier cell driver 220 supplies the driving voltages so as not to generate a substantial voltage difference between the common electrode 56 and the divided electrodes 54A and 54B. When the 3D image is implemented, the switchable barrier cell driver 220 supplies the driving voltages so as not to generate the substantial voltage difference between the common electrode 56 and the 2n-th electrodes 54B. The switchable barrier cell driver 220 supplies the driving voltages such that voltages applied to the common electrode 56 and the (2n−1)-th electrodes 54A have a voltage difference.

The pixel array cell driver 210 and the controller 230 are the same as described with reference to FIG. 19.

According to this document, the switchable lens cell or the switchable barrier cell for switching 2D and 3D images is directly implemented on a mother substrate using the transparent both-sided adhesive film. In addition, the joining process is performed by aligning mother substrates using alignment keys of the mother substrates. As a result, it is possible to decrease costs by reducing the number of mother substrates and to decrease the size of a display device. Further, the alignment is performed with mother substrate units by aligning the alignment keys of the mother substrates, and thus it is possible to heighten the degree of alignment of the pixel array cell with the switchable lens cell or the switchable barrier cell.

Although embodiments have been described with reference to a number of illustrative embodiments thereof, it should be understood that numerous other modifications and embodiments can be devised by those skilled in the art that will fall within the scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

The invention claimed is:

1. A stereoscopic image display device mother substrate comprising:
   a pixel array cell mother substrate provided with first alignment keys and including at least one pixel array cell which is provided with a plurality of pixel used to display 2D and 3D images;
   a switchable optical layer mother substrate provided with second alignment keys and including at least one switchable optical layer opposite to the pixel array cell; and
   a transparent both-sided adhesive film provided with third alignment keys and joining the pixel array cell to the switchable optical layer between the pixel array cell mother substrate and the switchable optical layer mother substrate,
   wherein the pixel array cell mother substrate, the switchable optical layer mother substrate and the transparent both-sided adhesive film is aligned by using the first to third alignment keys.

2. The stereoscopic image display device mother substrate of claim 1, wherein the transparent both-sided adhesive film includes:
   a film base;
   a first adhesive layer formed on one surface of the film base;
   a second adhesive layer formed on the other surface of the film base;
   a first protective film covering the first adhesive layer to protect the first adhesive layer; and
   a second protective film covering the second adhesive layer to protect the second adhesive layer.

3. The stereoscopic image display device mother substrate of claim 2, wherein the first adhesive layer faces the switchable optical layer and has substantially the same size as the switchable optical layer, and
   the second adhesive layer faces the pixel array cell and has substantially the same size as the pixel array cell.

4. The stereoscopic image display device mother substrate of claim 1, wherein the switchable optical layer mother substrate includes first and second mother substrates opposite to each other, and
   wherein electrodes are formed in a cell region of each of the first and second mother substrates corresponding to the pixel array cell, and a liquid crystal layer is formed in the cell region between the first and second mother substrates.

5. The stereoscopic image display device mother substrate of claim 4, wherein
   the thickness of each of the first and second substrates is about 20 μm to about 500 μm.

6. The stereoscopic image display device mother substrate of claim 1, wherein the pixel array cell is implemented by organic light emitting diode elements.

* * * * *